United States Patent [19]

Hetherington

[11] Patent Number: 5,589,119
[45] Date of Patent: Dec. 31, 1996

[54] SILICONE ELASTOMER SEALS FOR MOLDED PLASTIC PARTS

[75] Inventor: Ray C. Hetherington, Virginia Beach, Va.

[73] Assignee: New Southland, Inc., Virginia Beach, Va.

[21] Appl. No.: 362,276

[22] Filed: Dec. 22, 1994

[51] Int. Cl.⁶ ...................................................... B29C 59/00
[52] U.S. Cl. .............. 264/129; 264/211.24; 264/331.19; 427/387
[58] Field of Search ............................... 264/129, 211.24, 264/331.19; 427/387

[56] References Cited

U.S. PATENT DOCUMENTS

| | | | |
|---|---|---|---|
| 3,392,143 | 7/1968 | Holub | 260/46.5 |
| 3,487,122 | 12/1969 | Stengle | 260/826 |
| 3,781,237 | 12/1973 | Alvino et al. | 260/29.1 SB |
| 3,948,835 | 4/1976 | Greber et al. | 260/2 S |
| 4,471,007 | 9/1984 | Pate | 427/377 |
| 4,761,445 | 8/1988 | Chiba | 524/262 |
| 4,780,260 | 10/1988 | Yoshida et al. | 427/387 |
| 4,783,511 | 11/1988 | Schmid | 264/331.19 |
| 4,804,720 | 2/1989 | Tamura et al. | 525/431 |
| 4,822,852 | 4/1989 | Wittmann et al. | 525/66 |
| 4,877,855 | 10/1989 | Nagaoka et al. | 528/26 |
| 4,945,124 | 7/1990 | Weteppe et al. | 525/63 |
| 5,055,249 | 10/1991 | Schmid | 264/236 |
| 5,209,981 | 5/1993 | Rojstaczer | 428/447 |
| 5,244,598 | 9/1993 | Merrifield et al. | 252/314 |
| 5,263,880 | 11/1993 | Schwarz et al. | 439/733 |
| 5,274,065 | 12/1993 | Veith | 528/26 |
| 5,277,610 | 1/1994 | Krehbiel et al. | 439/271 |
| 5,302,459 | 4/1994 | Kim et al. | 264/331.19 |
| 5,322,448 | 6/1994 | Hahn | 439/157 |
| 5,326,387 | 7/1994 | Faber et al. | 106/3 |
| 5,336,102 | 8/1994 | Cairns et al. | 439/272 |
| 5,350,601 | 9/1994 | Culbertson et al. | 427/387 |
| 5,358,420 | 10/1994 | Cairns et al. | 439/206 |
| 5,366,806 | 11/1994 | Fujiki et al. | 428/412 |
| 5,405,655 | 4/1995 | Blum et al. | 427/387 |
| 5,407,986 | 4/1995 | Furukawa et al. | 524/262 |
| 5,447,446 | 9/1995 | Miller | 439/281 |

*Primary Examiner*—Mark D. Sweet
*Attorney, Agent, or Firm*—Millen, White, Zelano & Branigan, P.C.

[57] ABSTRACT

A process is described for bonding a silicone elastomer seal to a molded plastic part such as a plastic electric connector. Prior to molding aromatic polyamide pellets are pretreated with an aminofunctional silicone fluid. The pretreated polymer pellets are then molded in the presence of moisture to form a molded plastic part. Molding is performed at a temperature sufficient to chemically graft the amino function of the silicone fluid to the aromatic carbonyl function of the aromatic polyamide and to form silanol groups within the aminofunctional silicone fluid. The molded plastic part is coated with an organofunctional alkoxysilane having at least one vinyl group. The coated molded plastic part is heated in the presence of moisture, converting the alkoxysilane into a siloxane polymer with vinyl and silanol groups. These silanol groups then react with the silanol groups of the aminofunctional silicone fluid. Thereafter, a liquid silicone elastomer is applied to the coated molded plastic part. The elastomer contains sufficient Si—H groups to react with vinyl groups contained in the siloxane polymer formed from the alkoxysilane. The molded plastic part is heated to form a covalent bond between vinyl groups of the siloxane polymer and Si—H groups of the elastomer, whereby the liquid silicone elastomer forms a seal which is bonded to the molded plastic part.

23 Claims, 2 Drawing Sheets

FIG. I

SILICONE ELASTOMER SEALS FOR MOLDED PLASTIC PARTS

BACKGROUND OF THE INVENTION

The invention relates to seals for molded plastic parts. In particular, the invention relates to providing a silicone elastomer seal for molded plastic electrical connectors.

Electrical pin connectors are used in a variety of technological fields involving engines. So, for example, electrical pin connectors are used in such industries as automobiles, aircraft, lawn and garden equipment, building and construction equipment, marine equipment, etc. The housing of these electrical connectors are commonly made from molded polythalamide plastic. This material is used because of its high dielectric strength and durability. To ensure against the intervention of agents such as moisture, lubricants, fuels, or other contaminants which could adversely affect the electrical connection(s), a separate individual seal such as an O-ring made of, for example, nitrile rubber, EPDM (ethylene-propylene terpolymer made from ethylene-propylene diene monomer) and peroxide cured silicone, is provided between the male portion, also called the socket electrical connector or header block plug, and the female portion, also called the pin header connector or pin receptacle, of the electrical connectors. Typically, the separate seal is positioned on the male connector portion before the male and female portions are assembled together.

However, the seals commonly used for such electrical connectors exhibit disadvantages. For example, since the seals are manufactured separately from the connectors, they must be positioned between the electrical connector portions during manufacturing, thereby complicating production. Also, the possibility exists that the separate seal will fall off during assembly, thereby decreasing the reliability of the production process. Nitrile rubbers and EPDM elastomers exhibit an additional disadvantage with regard to operating temperature. Seals made of such materials have smaller operating temperature ranges, about −40° to 250° F., in comparison to the operating temperature range of HCR silicones, i.e., about −40° to 350° F.

An object of the invention, therefore, is to provide a silicone elastomer seal for use with molded plastic parts which is reliable and is advantageous for assembly purposes. In particular, an object of the invention is to provide a process for bonding a liquid elastomer seal to a molded plastic part made of aramid polymers, such as polythalamide, as well as the resultant seal-molded plastic part composite.

Upon further study of the specification and appended claims, further objects and advantages of this invention will become apparent to those skilled in the art.

These objects are achieved by a process comprising:

admixing an aramid polymer, preferably in solid form, and an aminofunctional silicone fluid;

molding the resultant pretreated aramid polymer, in the presence of moisture into a plastic part at a temperature sufficient to chemically graft the amino function of the silicone fluid to the aromatic carbonyl function of the aramid polymer and to form silanol groups in the aminofunctional silicone fluid;

coating the molded plastic part with an organofunctional alkoxysilane having at least one vinyl group and heating the coated molded plastic part to convert the alkoxysilane into a siloxane polymer with vinyl and silanol groups and react the silanol groups thereof with silanol groups of the aminofunctional silicone fluid; and applying a liquid silicone elastomer containing at least one Si—H group to the coated molded plastic part and heating same to form a covalent bond between vinyl groups of the siloxane polymer and Si—H groups of the elastomer, the liquid silicone elastomer forming a seal bonded to the molded plastic part.

The silicone elastomer seal-molded plastic part composite obtained by the inventive process exhibits several advantages. Since the seal is chemically bonded to the plastic part, the overall manufacturing process is simplified since separate positioning of a seal such as an O-ring seal and off-line manual assembly is eliminated. Thus, for example, assembly of the seal and the male and female portions of electrical connectors is thereby facilitated. Failures of the seal due to improper placement are also reduced. Also, the sealing properties are enhanced since the seal is itself bonded to the plastic part, rather than being a separate structural element. Also, the range of acceptable operating temperatures for the bonded seal is, for example, about −40° to 350° F., i.e., higher than that of the known nitrile rubber and EPDM elastomer separate seals. Furthermore, the bonded silicone elastomer seal remains in position even after many disassemblies of, for example, the electrical connectors. In the case of electrical connectors, the seal can be bonded to either the male or female portions, preferably the female portion.

The materials used for manufacturing the molded plastic parts are aramids, i.e., aromatic polyamides. Aramid polymers are amphorous polyamides which exhibit carbonyl groups attached to aromatic rings and can be obtained by reacting aromatic dicarboxylic acids with diamines in accordance with known conventional processes. For example, aromatic polyamides can be obtained by polycondensation of phthalic acid compounds (benzene dicarboxylic acid compounds), such as isophthalic acid and terephthalic acid compounds, with diamine compounds. In their backbone, these polymers exhibit carbonyl groups attached to aromatic rings due to the use of phthalic acid compounds as monomers. The diamine compounds used in production of the aramids exhibit a general structure NHR$^1$—R—NHR$^1$ where R is a divalent bridging group of 1–20 C atoms, for example, alkylene, aralkylene, cycloalkylene, or preferably phenylene, structures and R$^1$ is H or C$_{1-4}$-alkyl. Typically, these polymers exhibit repeating units of the following structure:

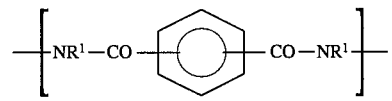

where R$^1$ is H or C$_{1-4}$-alkyl, preferably H.

Examples of such aramids are Nomex® (Dupont) and Kevlar® (Dupont). It is also possible for the phenylene group in this repeating structure to be laterally substituted, such as by —COOH groups or C$_{1-4}$-alkyl groups.

Preferably, the material used for forming the molded plastic parts of electrical conductors is made of polythalamide plastic which are amorphous polyamides based on terephthalic acid and diamines. Polythalamide plastics exhibit units in accordance with the following structure:

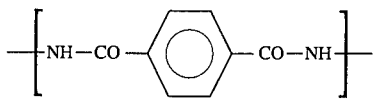

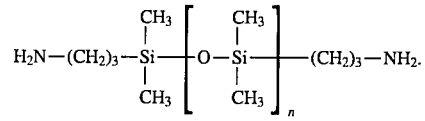

The aromatic polyamide plastics employed can contain additive material, such as mineral and glass reinforcement materials, up to, for example, 35% by weight, pigments, e.g., up to 5%, fillers, e.g., up to 45%, heat stabilizers, e.g., up to 2%, anti-oxidants, e.g., up to 1%, and flame retardants, e.g., up to 1%.

Although the aromatic polyamide can be used in melted form, it is preferably used in the form of solid particulates, such as pellets. The pellets can be, for example, in the shape of prills about 1–5 mm³ in size. The particulate form of the polymer facilitates molding as well as the admixing the plastic with an aminofunctional silicone. Preferably, the aromatic polyamide exhibits an inherent viscosity of at least 0.95 deciliters/g.

The aminofunctional silicone fluid which is mixed with the polyamide plastic particles functions as an adhesion promoter. Aminofunctional silicone fluids are well known in the art. They are amine-modified organopolysiloxanes exhibiting at least one siloxane unit of the formula:

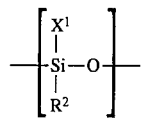

wherein $R^2$ is, e.g., a monovalent organo group and $X^1$ is an amine radical. For example, $R^2$ can be a monovalent hydrocarbon group of 1–20, preferably 1–7, C atoms, e.g., alkyl such as methyl, ethyl, propyl and butyl; aryl such as phenyl; alkylated aryl such as methylphenyl; cycloalkyl such as cyclopentyl, cyclohexyl or cycloheptyl; or aralkyl such as benzyl. $R^1$ can also be, for example, hydroxy or $C_{1-7}$-alkoxy or —COOH. $X^1$ can be, for example, —$(CH_2)_{0-6}$-$NHR^1$ wherein $R^1$ is H or $C_{1-4}$-alkyl.

In the other siloxane units of the aminofunctional silicone fluids, the silicon atoms are substituted by organo groups such as monovalent hydrocarbon groups having 1–20 C atoms, e.g., 1–7 C atoms, for example, methyl, ethyl, propyl, phenyl, cyclohexyl, cycloheptyl, benzyl and methylphenyl. The silicon atoms may also be substituted by hydroxy, $C_{1-7}$-alkoxy groups or —COOH groups. The viscosity of the aminofunctional silicone fluid is preferably within the range of 100–1,500 cps. By way of example, the aminofunctional silicone fluid can exhibit siloxane units in accordance with the following formulae:

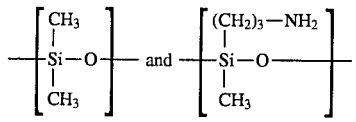

Examples of terminal groups are $(CH_3)_3Si$— and HOOC-$Si(CH_3)_2$— and $NH_2CH_2CH_2CH_2Si(CH_3)_2$—.

For example, the aminofunctional silicone fluid can be a modified polydimethylsiloxane of the formula:

In accordance with the process according to the invention, the aminofunctional silicone fluid is admixed with the aromatic polyamide plastic, preferably in the form of pellets, e.g., polythalamide pellets. The amount of aminofunctional silicone fluid added is generally about 0.01–1 wt. %, preferably about 0.05–1 wt. %, especially about 0.05–0.07 wt. %, based on the total weight of the aromatic polyamide.

The plastic, preferably in pellet form, and aminofunctional silicone fluid are mixed together to achieve a homogeneous admixture. In general, the aromatic polyamide and aminofunctional silicone fluid are introduced into a vessel and subjected to mechanical mixing. For example, the plastic pellets and aminofunctional silicone fluid can be tumbled in a 5 gallon steel bucket using an industrial mixer, such as a ribbon mixer, for a duration of about an hour.

The plastic pellets pretreated with the aminofunctional silicone fluid are then molded into a plastic part using, for example, a plastic injection molding machine in accordance with known molding techniques. In the injection machine, the pretreated plastic material is introduced into a hopper and conveyed to a screw which is heated to a temperature above the glass transition temperature, $T_g$, of the plastic, e.g., above 500° F. The plastic is then injected into a mold which is at a lower temperature, e.g., about 250°–400° F. The molding pressure will depend on the size of the part to be molded. Typically, the molding pressure is less than about 10,000 psi. Molding is performed at a temperature which is sufficient to soften the plastic pellets so that molding can occur and is sufficient to permit the grafting reaction to occur whereby the aminofunctional silicone fluid is grafted onto the aromatic carbonyl functionality of the aromatic polyamide plastic.

Also, the temperature should be sufficient to permit silanol groups to form on the aminofunctional silicone fluid as a result of the presence of moisture. Due to the inherent hydrophilic nature of the aromatic polyamide, there is always moisture present in the admixture of plastic material and aminofunctional silicone. Typically, such moisture is present even if the plastic material is subjected to a drying step prior to molding. Since moisture is typically inherently present, it generally is unnecessary to add moisture. The silanol groups are formed by a hydrosilylation reaction between the organo groups, preferably alkyl, e.g., —$CH_3$, and water.

Preferably, molding is performed at a temperature of 500°–600° F. For example, using a plastic injection molding machine with a temperature transition heat range of 500°–600° F., the pretreated plastic pellets can be properly molded and the grafting reaction and silanol formation will occur within the feed barrel of the injection machine. The time frame for a typical molding operation is generally about 5 minutes or more, typically about 5–10 minutes.

Following molding of the plastic part, the part is coated with an organofunctional alkoxysilane which will function as a crosslinking agent between the aminofunctional silicone fluid and the subsequently applied liquid silicone elastomer. The organofunctional alkoxysilane is of the general formula $R^3$—$Si(OR^4)_3$ wherein $R^3$ is an alkenyl group of 2–4 C atoms, preferably vinyl, and $R^4$ is an alkyl group of 1–4 C atoms. The carbon-carbon double bond of the $R^3$ group is preferably at the terminus of this radical. $R^3$ is preferably vinyl, allyl or 3-butenyl, especially vinyl. The carbon-carbon double bond is used for a subsequent hydrosilylation reaction with a hydride component of the liquid silicone elastomer.

In the presence of moisture and heat, the organofunctional alkoxysilane undergoes a polymerization reaction. Alkoxy groups attached to Si atoms are converted into silanol groups. The water for this reaction can originate from atmospheric moisture, thus eliminating any need to add water. Preferably, the reaction is performed under an atmosphere containing an amount of moisture equivalent to a relative humidity of about 50–80% at 20° C. The silanol groups subsequently react with one another via a condensation reaction whereby water is eliminated to form an oligomer. The resultant hydroxy-containing organopolysiloxane exhibits units of the following formula:

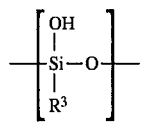

The organofunctional alkoxysilane is applied to the molded plastic part by suitable coating techniques. For example, the organofunctional alkoxysilane can be applied by dipping or can be sprayed onto the molded plastic part, e.g., by aerosol application. In these coating techniques, a solvent such as methylene chloride is preferably used. The layer formed by the coating procedure is typically thin, with a monolayer of organofunctional alkoxy silane molecules being preferred. Thereafter, the coated molded plastic part is heated to a temperature sufficient to induce polymerization of the alkoxysilane and induce reaction between silanol groups of the aminofunctional silicone fluid and silanol groups of the hydroxy-containing organopolysiloxane. In this reaction, $H_2O$ is eliminated and a covalent oxygen bond is formed between the organopolysiloxane, formed from the alkoxysilane, and the aminofunctional silicone fluid which was chemically grafted onto the aromatic polyamide during molding to form the molded plastic part. Preferably, the coated molded plastic part is heated to a temperature of 275°–300° F., e.g., 300° F., for a sufficient time period to permit the reactions to proceed, e.g., 3–4 minutes.

Thereafter, a liquid silicone elastomer composition, i.e., a VMQ (vinyl methyl silicone) elastomer composition, is applied to the primed molded plastic part and vulcanized. The liquid silicone elastomer preferably exhibits a viscosity of about 47–80 centistoke at 25° C.

In general, the liquid silicone elastomer composition contains two polysiloxane components and a catalytic amount of a curing catalyst, i.e., an addition reaction catalyst, preferably containing Pt. The elastomer composition can further contain pigment additives, e.g., up to 7 wt. %. Suitable pigments are those conventionally used in such silicone elastomer compositions and which do not adversely affect the curing reaction.

One polysiloxane component is made up of organopolysiloxanes containing at least one vinyl group bonded to a silicon atom per molecule. The other polysiloxane component is made up of organohydrogenpolysiloxanes containing hydrogen atoms bonded to silicon atoms. The ratio of Si—H groups to Si—CH=CH$_2$ groups is greater than one so that excess Si—H groups are available for reaction with the alkenyl groups of the hydroxy-containing organopolysiloxane, thereby bonding the cured silicone elastomer to the molded plastic part.

Other than the organo groups of the polysiloxanes used in the elastomer are monovalent hydrocarbon groups containing preferably 1–5 C atoms or halogenated monovalent hydrocarbon groups containing preferably 1–5 C atoms, e.g., methyl, ethyl, propyl and trifluoropropyl. In general, the polysiloxane components of the liquid silicone elastomer composition are polydimethylsiloxane possessing Si—CH=CH$_2$ or Si—H groups. As a result, in general, the cured silicone elastomer exhibits siloxane units of the following formulae:

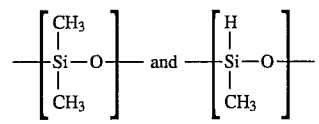

Using a transfer injection molding machine, the primed molded plastic part is insert molded. The liquid silicone elastomer is applied to the surface thereof by injection molding using a pressure of, for example, 5,000–10,000 psi. The pressure used is dependent on the size of the molded part but preferably is less than about 10,000 psi. The pressure should be such that the structure of the molded part is not adversely affected. The thickness of the elastomer layer can vary greatly depending, for example, on the type and structure of the molded plastic part and its intended use. For example, the thickness of the elastomer layer can be 1/32 to 1/8.

In the application of the liquid silicone elastomer, to the plastic part, the elastomer and plastic part are heated and the elastomer undergoes curing whereby a hydrosilylation reaction occurs between vinyl groups and silicon hydride groups and a covalent bond is formed between the cured silicone elastomer and the polysiloxane formed from polymerization of the organofunctional alkoxysilane. Preferably, the primed molded plastic part coated with the liquid silicone elastomer is heated to a temperature of about 300°–400° F., preferably 330°–340° F. The molding cycle is typically a time period of about at least 15 seconds, preferably 15–90 seconds.

All the materials described above, e.g., aromatic polyamides, aminofunctional silicone fluids, organofunctional alkoxy silanes, and liquid silicone elastomers, are well known within the art and are commercially available or can be prepared using known conventional synthesis procedures.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
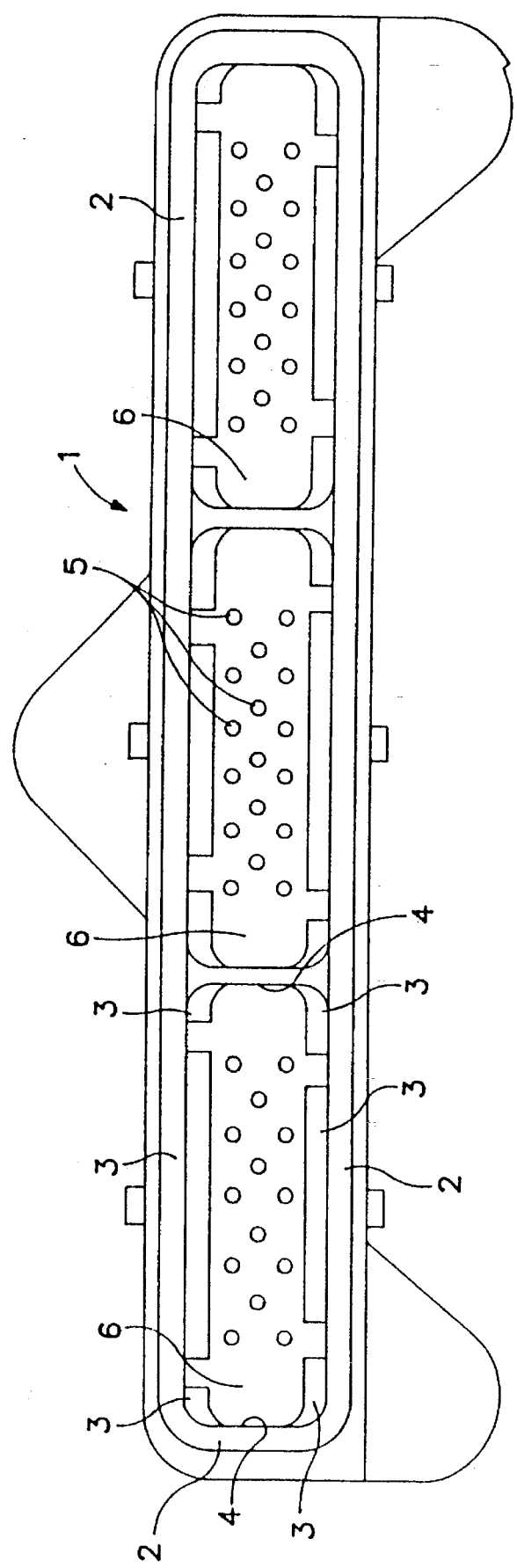
FIG. 1 illustrates a front view of a female portion electrical connector provided with a silicone elastomer seal in accordance with the invention.

The female portion electrical connector is indicated by 1. The connector is provided with three cavities 6. The back wall of each cavity is provided with a plurality of holes 5 in which pins for electrical connections will be inserted (not shown). Around the edge of the cavities 2, as well as along the side walls 4, there is provided a silicone elastomer seal bonded to the plastic molded part in accordance with the invention. Reference numeral 3 indicates surfaces which are raised with respect to the walls of the cavity. These surfaces are also recessed from the top edge of the cavity. The raised surfaces help in guiding male connectors which are to be inserted into the cavities 6. In addition, the raised surfaces help in providing a snug fit between the connector portions.

Figure 2:
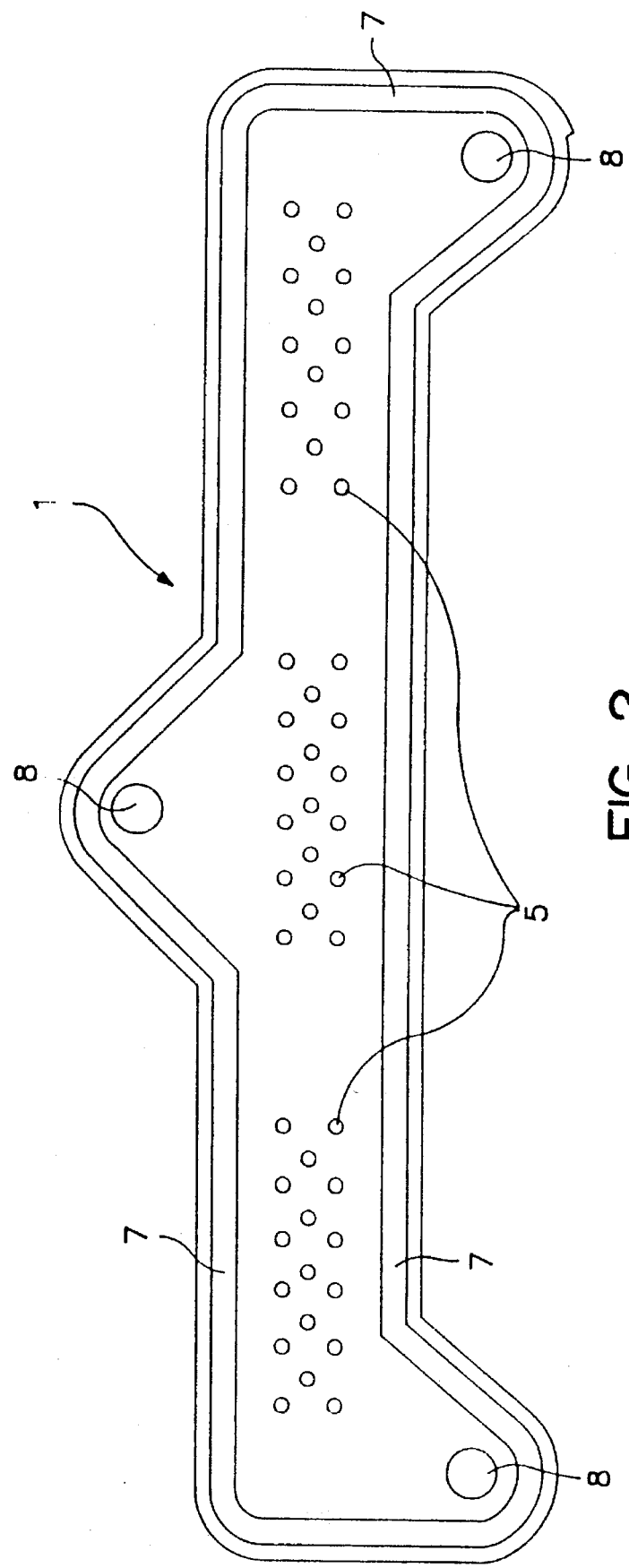
FIG. 2 illustrates a back view of the electrical connector shown in FIG. 1.

FIG. 2 shows the back surface of the female connector portion. The back surface is provided with bolt holes 8 for securing the connector portion to a surface such as a plate. In addition, the back surface of the connector is provided with a groove 7. Groove 7 is also provided with a silicone elastomer seal bonded to the molded plastic part in accordance with the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLE

Thirty pounds of polythalamide plastic pellets (Amodel 1340HS from Amoco Performance Plastics) are combined with 68 g of aminofunctional silicone fluid (Wacker F-784 from Wacker Silicone) in a ribbon mixer and the resultant mixture is blended together for 1 hour. The resultant pretreated plastic pellets are introduced into the hopper of a plastic injection molding machine and conveyed by a screw conveyer at a temperature of about 550° F., which is above the $T_g$ of Amodel 1340HS. The molten plastic is injected into a mold which is at a temperature of 350° F. to form a female electrical connector. The molding time is approximately 20 seconds.

The molded part is removed from the mold and sprayed with a primer, i.e., an organofunctional alkoxy silane (Dow-3-6060 from Dow Corning). The molded part coated with the primer is then dried in an oven at 300° F. for 3 minutes. Thereafter, the dried, primed, molded part is molded as an insert using a liquid silicone elastomer composition (GE-LIM-6050). The insert molding is conducted at 340° F. Upon application to the molded plastic part, the silicone elastomer undergoes curing and bonds to the plastic part via the primer.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process comprising:

admixing an aromatic polyamide polymer and 0.01–1 wt. %, based on the total weight of said aromatic polyamide polymer, of an aminofunctional silicone fluid;

molding the resultant pretreated aromatic polyamide polymer, in the presence of moisture into a plastic part at a temperature sufficient to chemically graft the amino function of the silicone fluid to the aromatic carbonyl function of the aromatic polyamide polymer and to form silanol groups in the aminofunctional silicone fluid;

coating the molded plastic part with an organofunctional alkoxysilane having at least one vinyl group and heating the coated molded plastic part to convert the alkoxysilane into a siloxane polymer with vinyl and silanol groups and react the silanol groups thereof with silanol groups of the aminofunctional silicone fluid; and applying a liquid silicone elastomer composition containing at least one Si—H group to the coated molded plastic part and heating same to form a covalent bond between vinyl groups of the siloxane polymer and Si—H groups of the elastomer, the liquid silicone elastomer forming a seal bonded to the molded plastic part.

2. A process according to claim 1, wherein said aromatic polyamide polymer is in solid particulate form when admixed with said aminofunctional silicone fluid.

3. A process according to claim 1, wherein said aromatic polyamide polymer is obtained by polycondensation of isophthalic or terephthalic acid with a diamine compound of the formula $NHR^1—R—NHR^1$ wherein R is phenylene, $C_{1-20}$-alkylene, aralkylene of up to 20 C atoms, or cycloalkylene of up to 20 C atoms; and $R^1$ is H or $C_{1-4}$-alkyl.

4. A process according to claim 1, wherein said aromatic polyamide polymer contains up to 35 wt. % mineral and/or glass reinforcement materials, up to 5 wt. % pigment, up to 45 wt. % fillers, up to 2 wt. % stabilizers, up to 1 wt. % antioxidants and/or up to 1 wt. % flame retardants.

5. A process according to claim 1, wherein said aromatic polyamide exhibits an inherent viscosity of at least 0.95 deciliters/g.

6. A process according to claim 1, wherein said aromatic polyamide polymer exhibits units in accordance with the following formula

7. A process according to claim 1, wherein said aminofunctional silicone fluid exhibits at least one siloxane unit of the formula

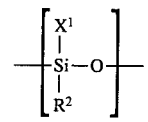

wherein $R^2$ is a monovalent hydrocarbon group of 1–20 C atoms, hydroxy, $C_{1-7}$-alkoxy or —COOH;

$X^1$ is —$(CH_2)_{0-6}$-$NHR^1$; and $R^1$ is H or $C_{1-4}$-alkyl.

8. A process according to claim 7, wherein $R^2$ is $C_{1-7}$-alkyl and $X^1$ is —$(CH_2)_3$—$NH_2$.

9. A process according to claim 1, wherein the viscosity of said aminofunctional silicone fluid is 100–1,500 cps.

10. A process according to claim 1, wherein said aminofunctional silicone fluid exhibits siloxane units in accordance with the following formulae

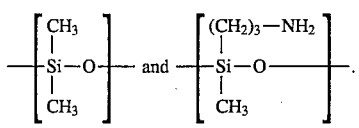

11. A process according to claim 1, wherein the amount of aminofunctional silicone fluid admixed with said aromatic polyamide polymer is 0.05–0.07 wt. % based on the total weight of said aromatic polyamide polymer.

12. A process according to claim 1, wherein, during molding of said pretreated aromatic polyamide polymer, the pretreated polymer is heated to a temperature of 500°–600° F. and injected into a mold which is at a temperature of 250°–400° F.

13. A process according to claim 1, wherein said organofunctional alkoxy silane is of the formula $R^3—Si(OR^4)_3$ wherein $R^3$ is an alkenyl of 2–4 C atoms, and $R^4$ is an alkyl group of 1–4 C atoms.

14. A process according to claim 1, wherein, after said molded plastic part is coated with said organofunctional alkoxy silane, the coated molded plastic part is heated to 275°–300° F. to convert the alkoxy silane into a siloxane polymer and to react silanol groups of the resultant siloxane polymer with silanol groups of the aminofunctional silicone fluid.

15. A process according to claim 1, wherein said liquid silicone elastomer exhibits a viscosity of about 47–80 centistokes at 25° C.

16. A process according to claim 1, wherein said liquid silicone elastomer contains up to 7 wt. % of at least one pigment.

17. A process according to claim 1, wherein, after application of said liquid silicone elastomer to said coated molded plastic part, the elastomer is heated to 300°–400° F.

18. A composition for use in molding plastic parts comprising, in admixture, a particulate solid aromatic polyamide polymer and an aminofunctional silicone fluid wherein said aminofunctional silicone fluid is present in an amount of 0.1–1 wt. % based on the total weight of said aromatic polyamide polymer.

19. A seal-molded plastic part composite prepared in accordance with claim 1.

20. A composite according to claim 19, wherein seal-molded plastic part composite is an electric pin connector having a silicone elastomer seal bonded thereto.

21. In an electric pin connector assembly comprising a pin header connector and a socket electrical connector, the improvement wherein said pin header connector or said socket electric connector is a seal-molded plastic part composite in accordance with claim 19.

22. A process according to claim 1, wherein said aromatic polyamide polymer is obtained by polycondensation of isophthalic or terephthalic acid with a diamine compound of the formula $NHR^1—R—NHR^1$ wherein R is divalent bridging group of 1–20 C atoms; and $R^1$ is H or $C_{1-4}$-alkyl.

23. A process according to claim 1, wherein said aminofunctional silicone fluid exhibits at least one siloxane unit of the formula

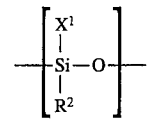

wherein
$R^2$ is a monovalent organo group;
$X^1$ is $—(CH_2)_{0-6}—NHR^1$; and
$R^1$ is H or $C_{1-4}$-alkyl.

* * * * *